R. PORTER.
Churn.
No. 735.  Patented May 10, 1838.
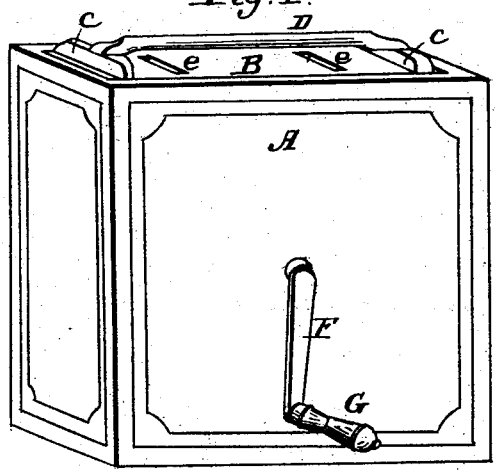
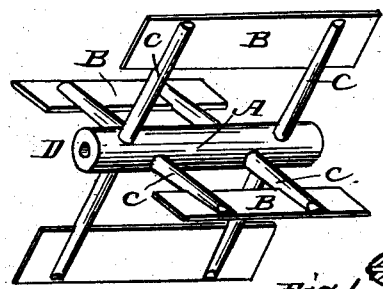
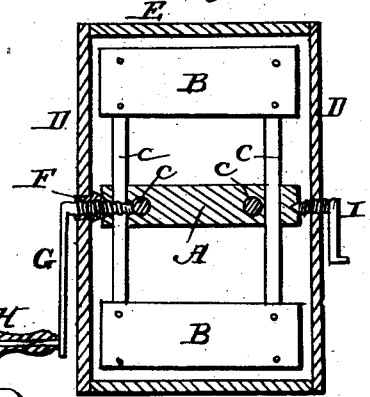
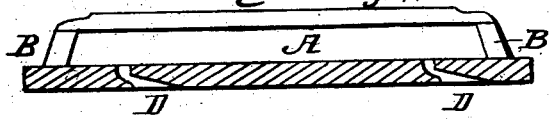
Witnesses:
John Baldwin Jr.
Theophilus Fellow
Inventor:
Rufus Porter

UNITED STATES PATENT OFFICE.

RUFUS PORTER, OF BILLERICA, MASSACHUSETTS.

CHURN.

Specification of Letters Patent No. 735, dated May 10, 1838.

*To all whom it may concern:*

Be it known that I, RUFUS PORTER, of Billerica, in the county of Middlesex and State of Massachusetts, have invented a new and useful Improvement in Churns not Hitherto Used or Known, and that the following is a full and exact description of the construction and operation of said improvement as invented by me.

A square box, eighteen inches long, ten inches wide and eighteen inches deep, is made of boards, three fourths of an inch thick, and fastened with screws or nails. The bottom of the box is three-eighths of an inch thick, being curved from end to end, so that the center of the bottom is three inches lower than the ends thereof, and is secured by means of curved grooves being cut in the sides of the box; the grain of the bottom running cross-wise. A rabbet is formed in the sides and ends of the box at the top, into which a lid is fitted, but not fastened. The lid consists of a square board, having cleats across the upper side, near the two ends. The cleats are two inches high, and three-fourths of an inch thick; and a handle one inch in diameter extends from the top of one cleat to that of the other, being fastened to each by screws. Two apertures are made through the lid for the purpose of ventilation; one aperture is about three inches from the left end of the lid, is five inches long and three-eighths of an inch wide, extending crosswise. This aperture is cut vertically one-fourth of an inch deep; then turns horizontally toward the right, and descends at an angle of ten degrees with the horizon, thus passing out at the bottom of the lid near the center. The wood below the aperture does not extend to an edge, but is cut of vertically a little to the right of the point at which the aperture commences. The other aperture is made in the same fashion, about three inches from the right end of the lid, and turning to the right also, extends near to the end of the lid. The advantage of having apertures made on this peculiar fashion is, that during the process of churning a continuous current of air passes into the churn by one aperture, and out at the other by the motion of the dasher, yet the cream is not thrown out thereby. A round hole one inch in diameter is bored through the center of the front of the box; in this is fixed a plug which extends inward, tapering conically, three-fourths of an inch from the side of the box; and having a hole through its center, half an inch in diameter, is turned the hollow cone. An iron screw two inches long and half an inch in diameter, and having a conical point, passes through the center of the back side of the box, opposite the hollow cone, pointing inward, and is termed the center screw. A cylindrical shaft of wood, eight inches long and two inches in diameter, is placed horizontally, extending from the hollow cone to the center screw. In the center of one end of the shaft is a hole half an inch in diameter, extending three inches from the end; and being rimmed out to the diameter of three-fourths of an inch at the end of the shaft, to receive the point of the hollow cone, which supports one end of the shaft, while the other end is supported by the point of the center screw; which penetrates the center one-fourth of an inch. Four round bars or rods, sixteen inches long and one inch in diameter, pass through the shaft; two of these rods are parallel, and about five inches apart, each being one inch from one end of the shaft. The other two are parallel to each other, but at right angles with the first pair, and three inches apart; the four bars thus constituting eight arms. The hole in the center of the shaft is continued through the two rods nearest the hollow cone; the second of which, having a notch one inch long and one-fourth of an inch deep, cut in the front side thereof at the center, a piece of iron of dimensions to fill said notch, is fitted and placed therein before the rod is driven through the shaft. This piece of iron has a mortise half an inch long and one-sixth of an inch wide, through its center, which is thus brought in contact with the hollow center of the shaft. A piece of round iron half an inch in diameter, has a tenon formed on one end and a crank on the other; about three inches of the length of the iron remaining straight and round. The crank has a six-inch lever, and a handle of wood; and the tenor is one inch long, half an inch wide and one-eighth of an inch thick; that being passed through the hollow cone, into the shaft, the tenon is made to enter the mortise in the center iron; and the tenon being twisted a little forward, enters the mortise spirally on the principle of the screw, that while the crank is pressed forward, the tenon is prevented coming out of its place. In the end of each arm a slot is made one-fourth of an inch wide and extending three inches from the end; and a board eight inches long, three inches wide and one-fourth of an inch thick, is placed and fastened in the slots of each parallel pair of arms; each board being parallel with the shaft. These float boards, together with the arms and shaft constitute what is termed the rotary dasher. By this arrangement the rotary dasher may be put in motion by means of the crank, and when occasion requires, the crank may be withdrawn, the center screw turned back, and the dasher may be taken out, which will facilitate the collecting of the butter and cleaning the churn.

I claim as my invention—

The mode of ventilation, and the method of adjusting the crank to the dasher by a twisted tenon.

RUFUS PORTER.

Witnesses:
STEPHEN T. PORTER,
MARSHALL PRESTON.